United States Patent [19]

Yamashita

[11] Patent Number: 5,175,419

[45] Date of Patent: Dec. 29, 1992

[54] IDENTIFICATION METHOD FOR MARKERS HAVING A PLURALITY OF MAGNETIC THIN LINES OR BANDS WITH VARIOUS COERCIVITIES

[75] Inventor: Mitsuo Yamashita, Kawasaki, Japan

[73] Assignee: Fuji Electric Co., Ltd., Kawasaki, Japan

[21] Appl. No.: 561,950

[22] Filed: Aug. 2, 1990

[30] Foreign Application Priority Data

Aug. 17, 1989 [JP] Japan ............................ 1-211821

[51] Int. Cl.⁵ ............................................. G06K 7/08
[52] U.S. Cl. ................................... 235/449; 340/551
[58] Field of Search ..................... 235/439, 493, 449; 340/551, 572

[56] References Cited

U.S. PATENT DOCUMENTS

| | | | |
|---|---|---|---|
| 3,832,530 | 8/1974 | Reitboeck et al. | 340/551 |
| 3,842,246 | 10/1974 | Kohler et al. | 235/439 |
| 4,134,538 | 1/1979 | Lagarde et al. | 340/572 |
| 4,195,771 | 4/1980 | Lagarde | 235/380 |
| 4,539,558 | 9/1985 | Fearon | 340/551 |
| 4,568,921 | 2/1986 | Pokalsky | 340/572 |
| 4,581,524 | 4/1986 | Hoekman et al. | 235/493 |
| 4,647,917 | 3/1987 | Anderson, III et al. | 340/551 |
| 4,757,206 | 7/1988 | Ohta | 235/462 |
| 4,779,077 | 10/1988 | Lichtblau | 340/572 |
| 4,883,949 | 11/1989 | Kokubo et al. | 235/449 |
| 4,940,966 | 7/1990 | Pettigrew et al. | 340/551 |
| 4,956,636 | 9/1990 | Sansom et al. | 340/572 |

Primary Examiner—John W. Shepperd
Assistant Examiner—Michael C. Kessell
Attorney, Agent, or Firm—Spencer, Frank & Schneider

[57] ABSTRACT

An identification method using a magnetic marker including a plurality of amorphous magnetic, thin wires or thin bands which have highly rectangular hysteresis curves and different coercive forces, and are disposed in a parallel fashion with a predetermined separation each other. The magnetic marker is attached to an article passing through the alternating magnetic field. This induces a temporal pulse train in a detection coil, which serves to identify the magnetic marker and therefore the article by pattern recognition of the pulse train. An instrumentation unit stores in advance the occurrence time of each pulse when the magnetic marker passes through the alternating magnetic field with the standard maximum value, and the stored occurrence time (phase) of each pulse is adopted as the reference. A magnetic marker, is identified by passing the marker through a first alternating magnetic field to produce a first pulse train corresponding to the magnetic thin wires or bands. An adjustment value is calculated which is a function of the phase of a selected pulse of the first pulse train and the stored reference phases are corrected on the basis of the adjustment value. This corrected reference phases are compared to the phases of the detected pulses of the first pulse train and the article is identified on the basis of the comparison.

9 Claims, 11 Drawing Sheets

IDENTIFICATION METHOD FOR MARKERS HAVING A PLURALITY OF MAGNETIC THIN LINES OR BANDS WITH VARIOUS COERCIVITIES

BACKGROUND OF THE INVENTION

1. Field of the Invention

The present invention relates to an identification method of magnetic markers which are attached to articles to identify their kinds or to count the number thereof.

2. Description of the Prior Art

Attaching magnetic materials to articles and detecting the materials by using an alternating magnetic field to identify the article and to prevent them from being stolen is a known technique. In other words, the magnetic materials can be used as magnetic markers. For example, an article incorporating markers is prepared, the markers being made of such material as amorphous magnetic thin wires or thin bands, which have highly rectangular magnetic hysteresis curves. When the article passes through an alternating magnetic field, the field induces the magnetization inversion in the magnetic wires or bands. The magnetization inversion in turn produces the change in the magnetic flux, which can be detected by a detection coil externally provided. Since the amorphous magnetic materials exhibit excellent softiron magnetic characteristics which prior materials do not possess, magnetic markers of high sensitivity and small size can be achieved by the amorphous materials. Moreover, combining and depositing a plurality of amorphous magnetic thin wires or thin bands of different coercive forces makes it possible to identify magnetic markers and therefore the kind of articles. This is achieved because the amplitudes of the magnetic field at which the magnetization inversions occur vary depending on the magnetic materials, and so the magnetization inversions are detected as a temporal pulse train by using, for example, a triangular waveform or sinusoidal waveform magnetic field. This method identifies the kind of articles either by detecting the presence or absence of a pulse, or by detecting the level of pulses: the former detects the presence or absence of pulses at the expected phases of the alternating magnetic field corresponding to the coercive force of each magnetic material, that is, at the expected timing corresponding to these phases; the latter detects the voltage levels of respective pulses at given phases of the alternating magnetic field.

Although these two methods are effective, it sometimes occurs that the identification of the magnetic markers or the articles cannot be carried out. This is because the phases at which the pulses are generated by the magnetization inversion vary according to the difference of peak values of the alternating magnetic fields that magnetize the magnetic wires, and the peak values vary owing to the distribution of the alternating magnetic field in the region through which the markers pass, and to the direction in which the magnetic wires pass through the magnetic field.

SUMMARY OF THE INVENTION

It is therefore an object of the present invention to provide an identifying method of magnetic markers that can correctly identify articles by accurately detecting the pulses induced in the detection coil by the magnetization inversion, even if the peak values of the alternating magnetic field vary.

The method of the present invention includes the following steps: storing occurrence time of the pulses as the reference time when the magnetic thin wires pass through a standard alternating magnetic field of a known peak intensity; determining occurrence time of pulses with regard to, for example, a zero-cross point of the alternating magnetic field, each time the change of the magnetic flux of the magnetic thin wires is detected; comparing the determined occurrence time of the pulse of a magnetic thin wires with the reference time; calculating the ratio of the occurrence time to the reference time; and correcting the occurrence time of the other pulse according to the ratio. Thus, the occurrence time of the first, second, third, . . . n-th pulses measured from the zero-cross point of the alternating magnetic field is corrected. This makes it possible to evaluate the phases of pulses generated by the magnetic thin wires. Incidentally, the above discussed zero-cross point of the alternating magnetic field is determined as the occurrence time of the pulse produced from the magnetic thin wire of the smallest coercive force.

The identification method of the present invention, as described above, takes the following steps to avoid the influence of the fluctuation of the magnetic field: storing in advance, as the reference time (or as a reference pulse train), the occurrence time of the pulses (or the phases of the pulse train) generated from the magnetic thin wires placed in the alternating magnetic field of a known peak intensity; detecting the occurrence time (or the phases) of the pulses generated from the magnetic thin wires when the magnetic thin wires are subjected to the change of the peak intensity of the magnetic field owing to the change in the direction of the magnetic thin wires in the magnetic field; and correcting the occurrence time (or the phases) of the detected pulses according to the relationship (ratio) between the occurrence time (or phases) of the detected pulses and the reference time (or the reference phases). For example, the ratio between the respective occurrence time (or phases) of the first detected pulse and the first reference pulse is used to correct the occurrence time (or the phases) of the succeeding detected pulses. Thus, the occurrence time (or the phases) of the detected pulses can be inferred and corrected. This makes it possible to avoid the influence of change in the magnetic field when the magnetic markers pass in various manners through the alternating magnetic field of different intensities. As a result, the kind of magnetic markers or the articles can be reliably identified.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

[A] FIRST EMBODIMENT

First, an outline of an article identification apparatus to which the identification method of the present invention is applied will be described.

Figure 1:
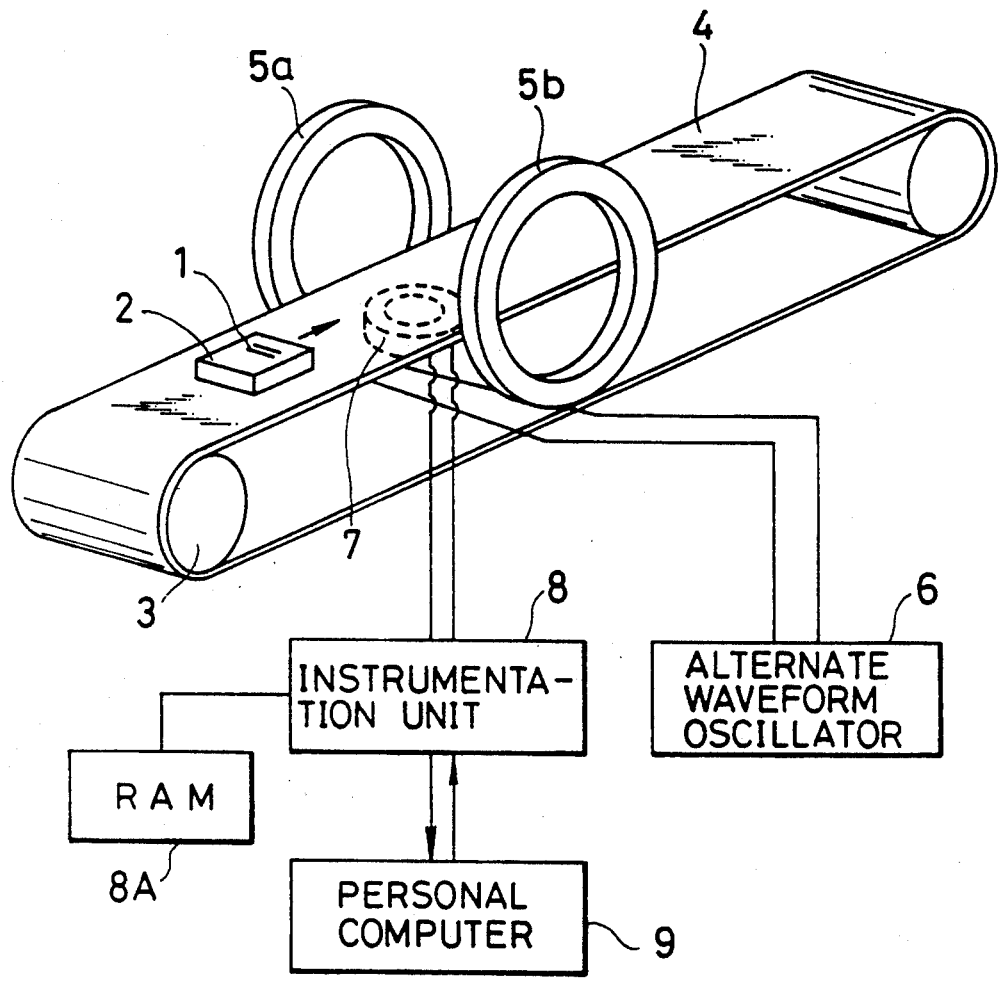
FIG. 1 is a perspective view showing the construction of the major portion of an article identifying apparatus to which the present invention is applied.

FIG. 1 is a schematic view showing the arrangement of the major portion of an example of the apparatus. In FIG. 1, an article 2 to which a plurality of magnetic markers 1 are affixed is placed on a belt 4 passing about two pulleys 3. The article 2 along with the magnetic markers 1 is transported by the belt 4 driven by the pulleys 3 in the direction indicated by the arrow. On each side of the belt 4, there is provided a respective one of two exciting coils 5a and 5b that generate an alternating magnetic field. The exciting coils are connected to an alternating waveform oscillator 6. The alternating magnetic field cause the magnetic markers 1 to produce changes in the magnetic flux accompanying the magnetization inversions of the magnetic markers 1. The changes in the magnetic flux are detected by a detection coil 7 as induction voltages. The detection coil 7 is connected to an instrumentation unit 8. The instrumentation unit 8 performs signal processing on the induced voltage pulse train generated from the detection coil 7. The instrumentation unit 8 detects the presence or absence of the pulses at the phases determined according to a reference alternating magnetic field and converts the pulse train into a pattern recognizable scheme, such as "1"/"0" notation. A personal computer 9 connected to the instrumentation unit 8 identifies the kind of magnetic markers 1 according to a process described later.

When the article 2 (i.e., a detected object) to which the magnetic markers 1 are attached is transported between the exciting coils 5a and 5b by the belt 4 as shown in FIG. 1, magnetic markers 1 are magnetized by the alternating magnetic field, thereby to produce magnetic flux inversions. The detection coil 7 detects the flux inversions, and generates a pulse train corresponding to the flux inversions. The instrumentation unit 8 converts the pulse train into a "1"/"0" pattern, and the personal computer 9 recognizes the pattern, thus identifying the kind of magnetic markers 1 or the article 2.

The construction and the identifying method of the magnetic markers used in the present embodiment will now be described. It is preferable that magnetic markers 1 be made, for example, of ironbased amorphous magnetic thin wires or thin bands, the magnetic hysteresis characteristics of which have highly rectangular characteristics as shown in FIG. 3. These materials per se can be used as magnetic markers 1, but they can be arranged as shown in FIGS. 2A and 2B to form detected elements.

Figure 2A:
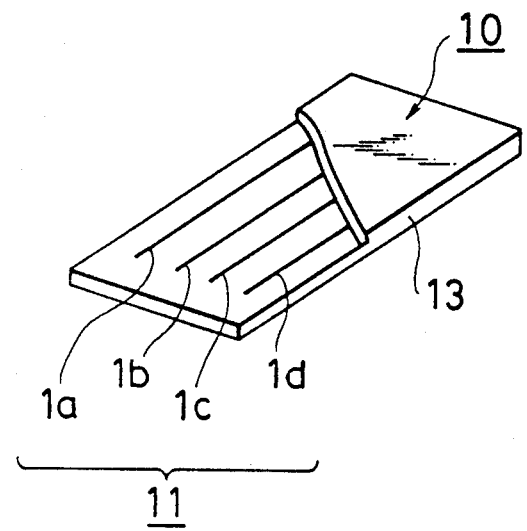
FIGS. 2A and 2B are partially cutaway perspective views showing the construction of detected elements using magnetic thin wires.
Figure 2B:
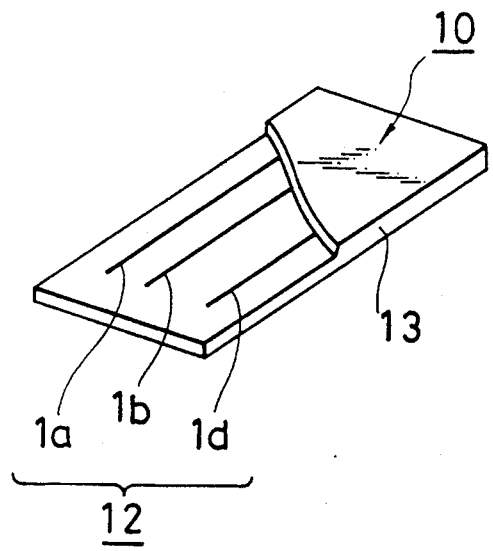
Figure 3:
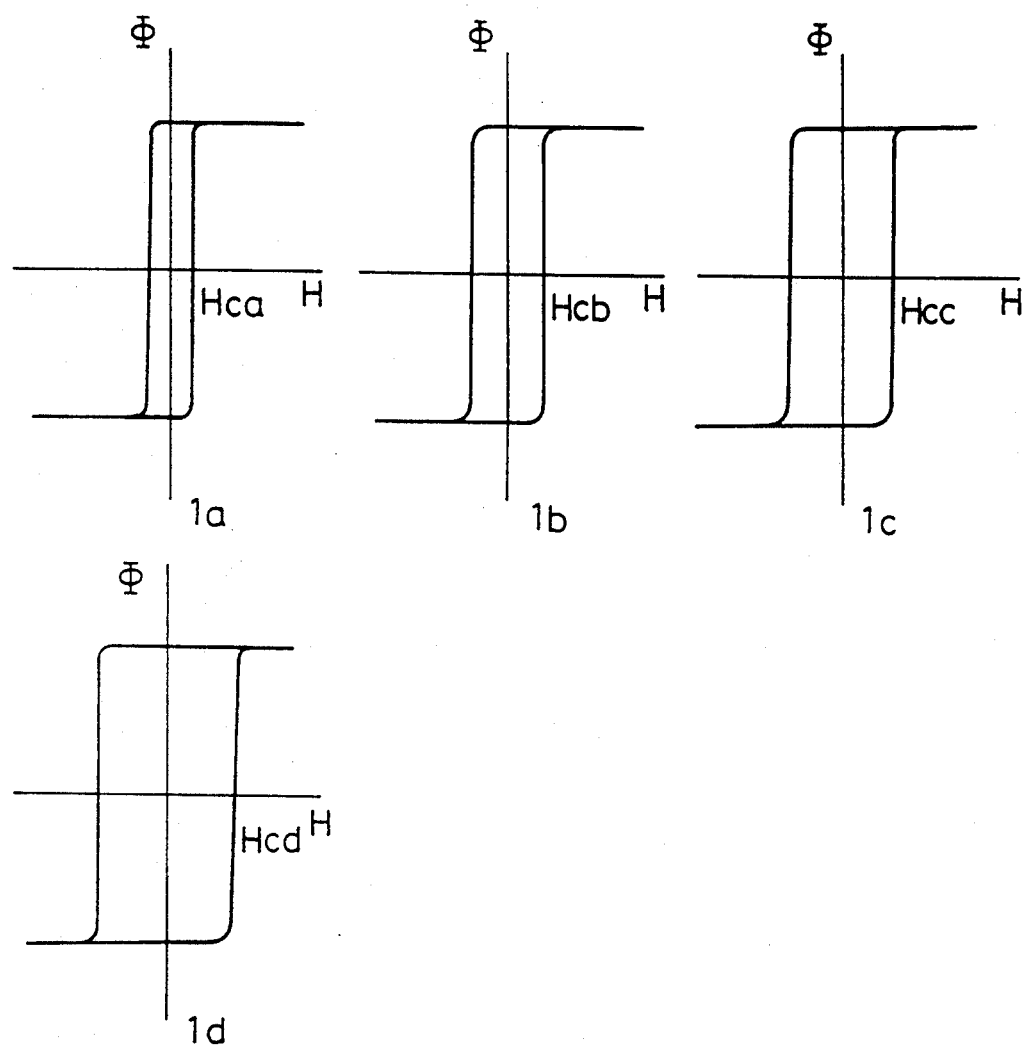
FIG. 3 illustrates the magnetic hysteresis curves of magnetic thin wires.

FIGS. 2A and 2B are partially cutaway perspective views showing the detected elements 10. In FIG. 2A, four amorphous magnetic thin wires 1a, 1b, 1c and 1d are placed in a parallel fashion to form a magnetic marker 11. The magnetic marker 11 is embedded in a fixing plate 13 made of two plastic thin films. On the other hand, in FIG. 2B, three amorphous magnetic thin wires 1a, 1b and 1d are used to form a magnetic marker 12, and the marker 12 is embedded in the fixing plate 13 to form the detected element 10. In other words, the detected element 10 in FIG. 2B lacks the amorphous magnetic thin wire 1c in comparison with the detected element 10 in FIG. 2A. The magnetic thin wires 1a, 1b, 1c and 1d have different coercive forces Hca, Hcb, Hcc, and Hcd, respectively, as shown in FIG. 3: the coercive forces have the relationship of Hca<Hcb<Hcc<Hcd as shown in FIG. 3.

Figure 4A:
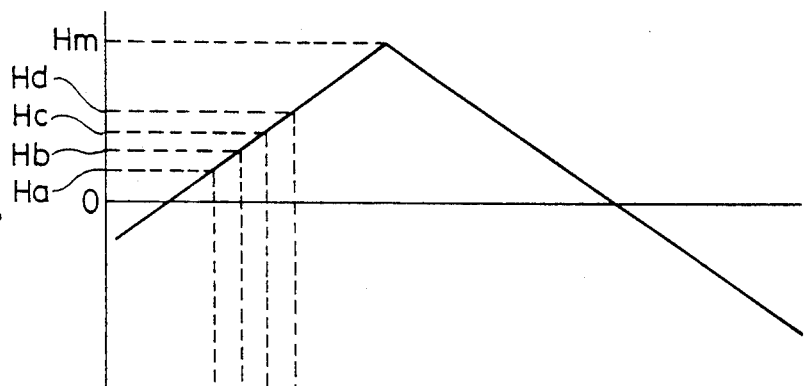
FIG. 4A is a waveform chart illustrating the waveform of an alternating magnetic field.
Figure 4B:
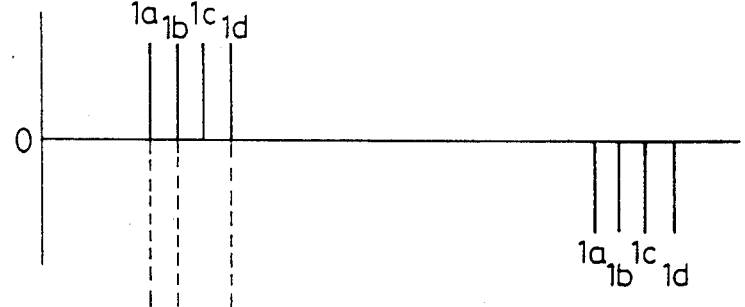
FIG. 4B is a diagram illustrating a pulse train generated from a magnetic marker 11.
Figure 4C:
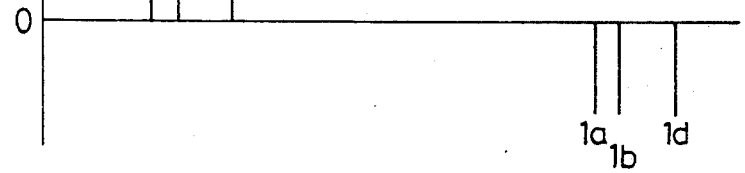
FIG. 4C is a diagram illustrating a pulse train generated from a magnetic marker 12.

FIGS. 4A-4C show a triangular waveform of an alternating magnetic field, along with the pulse trains induced in the detection coil 7 by imposing the alternating magnetic field. More specifically, FIG. 4A shows the waveform of the alternating magnetic field, FIG. 4B shows the pulse train induced in the detection coil 7 when the magnetic marker 11 is used, and FIG. 4C shows the pulse train induced in the detection coil 7 when the magnetic marker 12 is used. Respective x axes represent time. In FIGS. 4B and 4C, pulses corresponding to respective magnetic thin wires 1a-1d are designated by the reference characters 1a-1d. Here, the magnetic field of the triangular waveform is used to help understanding. The case in which the magnetic field of a sinusoidal alternating magnetic field is used will be described later.

FIGS. 4A-4C show that the pulses occur at phases Ha, Hb, Hc, and Hd of the triangular waveform magnetic field, respective phases corresponding to the magnetic thin wires 1a, 1b, 1c, and 1d of the magnetic markers 11 and 12. A reference character Hm on the y axis of FIG. 4A designates the maximum value of the alternating magnetic field. These pulse trains are applied to the instrumentation unit 8, and are converted into "1"/"0" patterns as shown in Table 1.

TABLE 1

| magnetic thin wire | 1a | 1b | 1c | 1d |
|---|---|---|---|---|
| magnetic marker 11 | 1 | 1 | 1 | 1 |
| magnetic marker 12 | 1 | 1 | 0 | 1 |

If the maximum value Hm of the alternating magnetic field shown in FIG. 4A is maintained constant when the magnetic markers 11 and 12 pass through the magnetic field, the pulses corresponding to respective magnetic thin wires 1a, 1b, 1c and 1d will occur consistently at the same phases of the magnetic field. The commonly used Helmholtz coils 5a and 5b shown in FIG. 1, however, cannot produce a perfect uniform magnetic field. In addition, the component of the magnetic field contributing to the magnetization of the magnetic markers 11 and 12 vary according to the direction in which the magnetic markers 11 and 12 are placed in the alternating magnetic field. Owing to these factors, a phase shift of the pulses generated by respective magnetic markers 11 and 12 occurs, and this hinders the correct recognition of the pulse train.

Figure 5A:
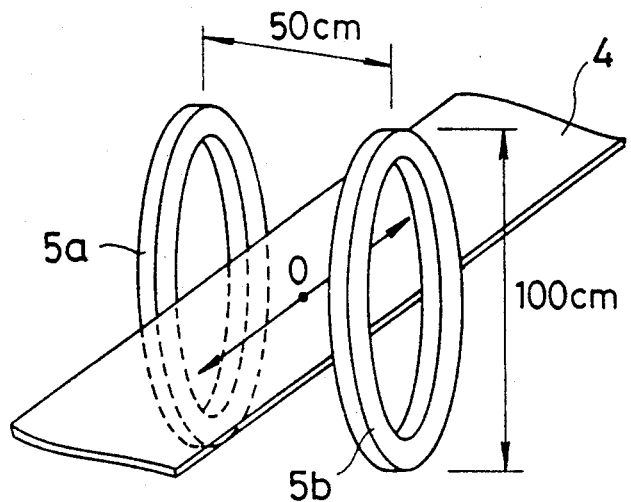
FIG. 5A is a schematic perspective view showing an arrangement of Helmholtz coils.
Figure 5B:
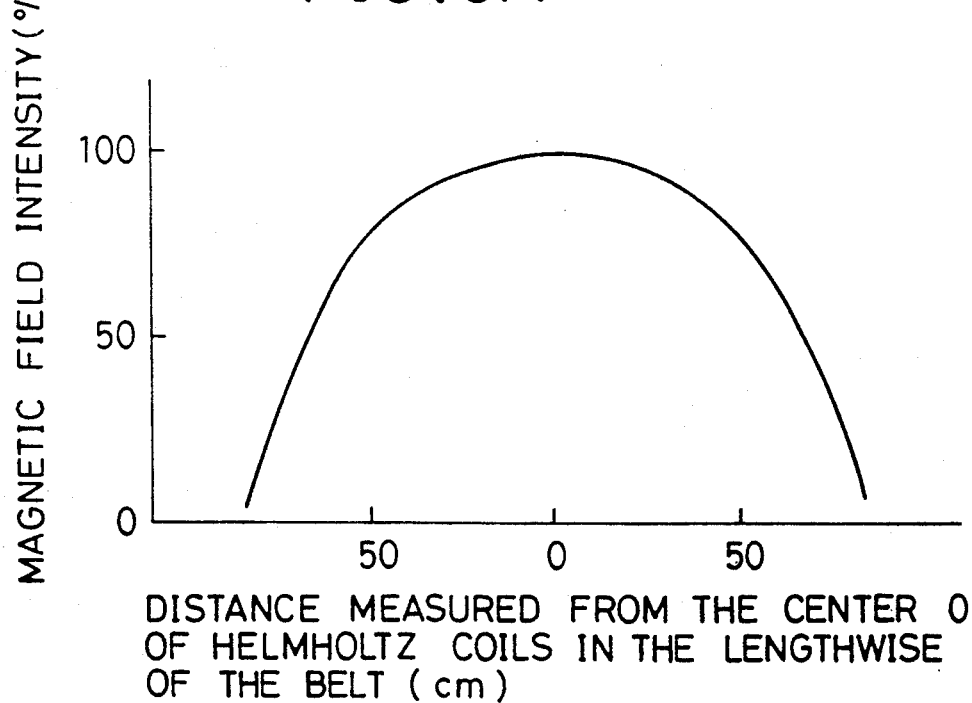
FIG. 5B is a graph illustrating the distribution curve of a magnetic field due to the Helmholtz coils.
Figure 6:
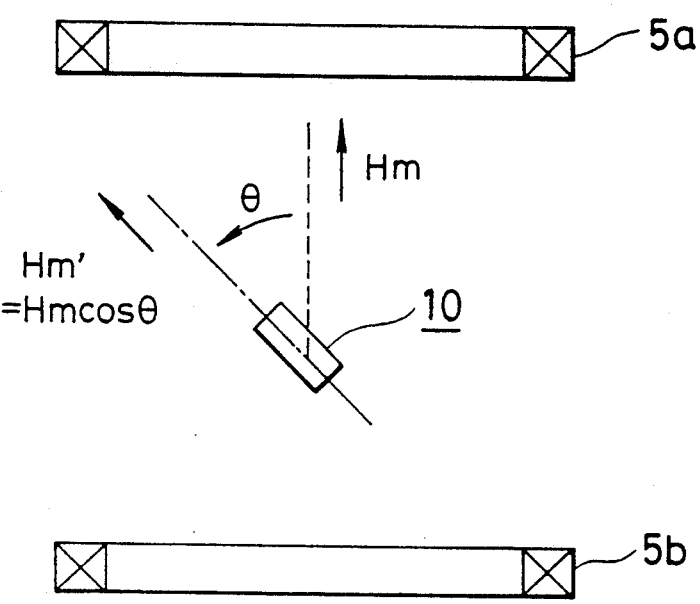
FIG. 6 is a schematic plan view showing the positional relationship between the detected element and the Helmholtz coils.

FIG. 5A shows a schematic arrangement of the ideal Helmholtz coils 5a and 5b which produce a parallel magnetic field, and FIG. 5B shows the distribution curve of the magnetic field produced by Helmholtz coils. The detected element 10 including the magnetic marker 11 or 12 is often placed on the belt 4 in such a manner that the element 10 is inclined to some extent to the axis of the Helmholtz coils 5a and 5b. This is schematically shown in FIG. 6. FIG. 6 shows that the maximum value Hm decreases to Hm' when the detected element 10 placed between the Helmholtz coils 5a and 5b is inclined by an angle $\theta$.

From the above description it will be seen that it is essential to correctly relate the phases of the pulse train that occur in connection with the magnetic thin wires 1a, 1b, 1c and 1d to the phases of the reference alternating magnetic field waveform, respectively, so that the kind of the magnetic markers 11, 12, etc. can be correctly recognized by the pattern obtained by converting the pulse train produced from the detection coil 7 into the binary notation represented by "1" and "0".

The method for corresponding the phases will be described.

Figure 7A:
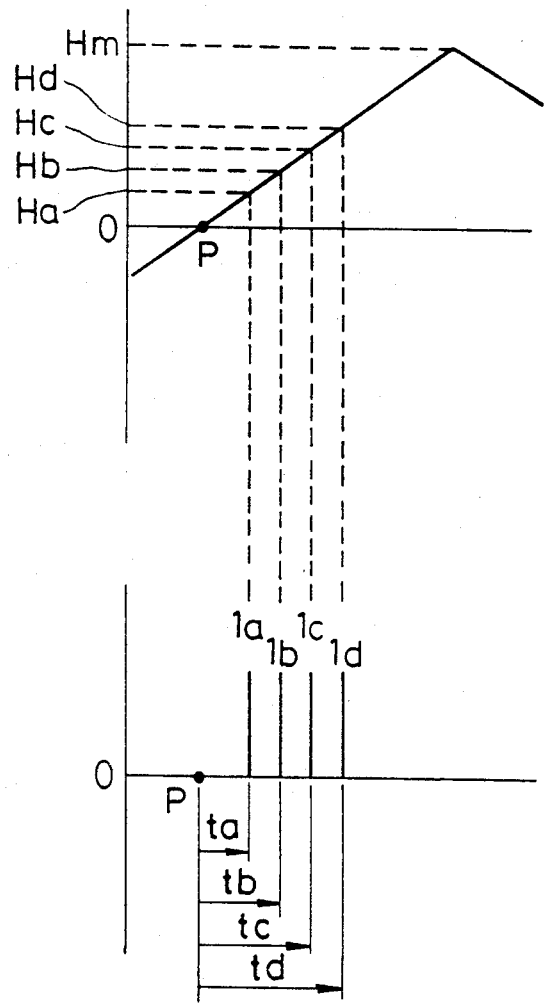
FIG. 7A is a diagram illustrating the reference triangular waveform of the alternating magnetic field, along with a pulse train generated by the waveform.
Figure 7B:
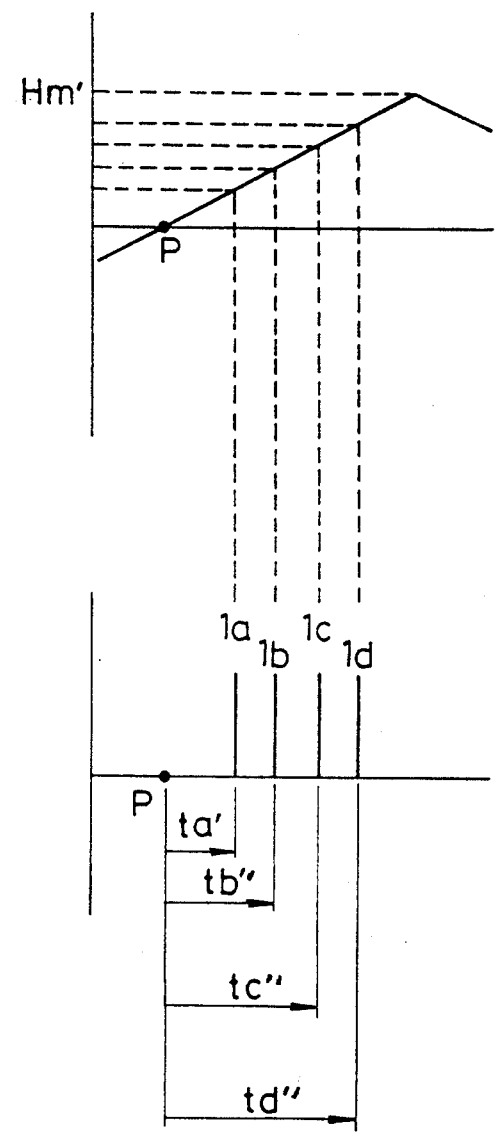
FIG. 7B is a diagram illustrating a waveform and the pulse train generated by the waveform in the case where the peak value of the magnetic field varies.

FIGS. 7A and 7B are diagrams analogous to FIGS. 4A-4C: FIG. 7A is a diagram illustrating the standard triangular waveform of the alternating magnetic field, the maximum value of which is Hm; and FIG. 7B illustrates the phase shifted waveform when the inclination $\theta$ in FIG. 6 is 41 degrees, and the maximum value Hm' is lower than Hm by 25%. In these figures, respective pulses in the pulse train are designated by the reference numerals 1a–1d denoting the corresponding magnetic thin wires of the magnetic marker 11.

Figure 8:
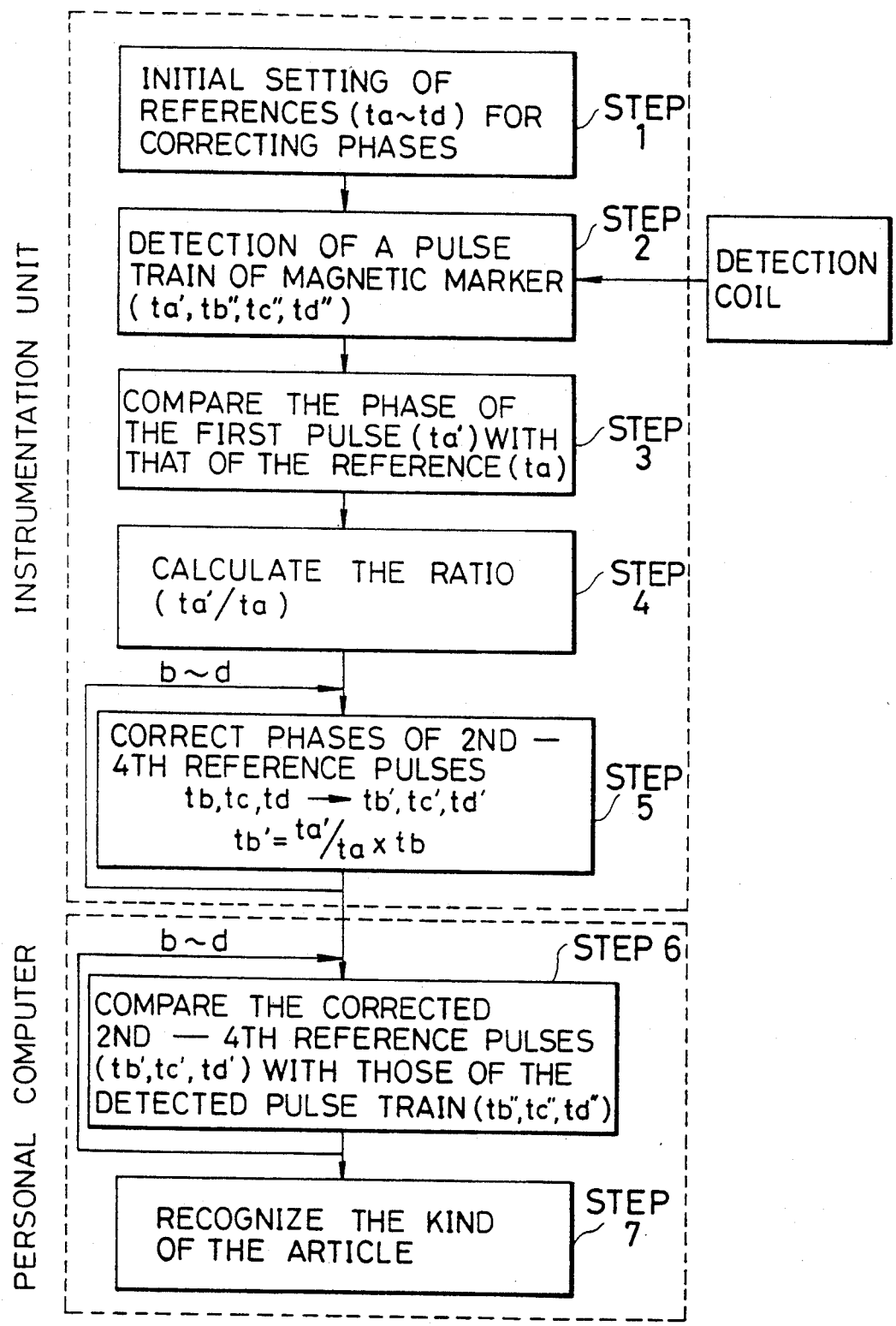
FIG. 8 is a flowchart showing the procedure of a first embodiment of the present invention.

FIG. 8 is a flowchart showing the procedure of phase correction of the pulse train when the triangular waveform alternating magnetic field is applied. The flowchart shows the procedure in which the pulse generated in connection with the first magnetic thin wire 1a is adopted as the reference pulse, the phase positions of the other pulses are inferred on the basis of the reference pulse, and the kind of the article is identified by comparing the detected pulse train with the inferred phase positions. Incidentally, in the flowchart, STEP 1-STEP 5 are conducted by the instrumentation unit 8, and STEP 6 and STEP 7 are performed by the personal computer 9.

Next, the procedure of the first embodiment will be explained with reference to FIGS. 7A, 7B and 8. The indentification of the pulse train is performed by the steps of: setting the zero-cross point P of the magnetic field as the reference point on the time base; storing in advance in the RAM 8A the phases of the reference pulse train corresponding to the thin magnetic wires 1a–1d in the form of time ta, tb, tc and td which are defined as the time from the zero-cross point P to the occurrence points of respective pulses corresponding to the thin magnetic wires 1a–1d (STEP 1); detecting time ta' at which the first pulse occurs when the maximum value of the magnetic field changes from Hm to Hm' (STEP 2); calculating the ratio of time ta' to the pre-stored reference time ta, ta'/ta, (STEP 3 and STEP 4); and calculating times tb', tc' and td', the inferred occurrence time of the reference pulses corresponding to the magnetic thin wires 1b, 1c and 1d as measured from the zero-cross point P, by using the following equations (STEP 5).

$$t_b' = \frac{t_a'}{t_a} \times t_b, \ t_c' = \frac{t_a'}{t_a} \times t_c, \ t_d' = \frac{t_a'}{t_a} \times t_d$$

In this case, magnetic markers must be provided with such a magnetic material like the first magnetic thin wire 1a of the magnetic marker 11 so that the pulse corresponding to the first magnetic thin wire 1a is sure to be generated as in the present embodiment. In addition, the time ta-td measured from the zero-cross point P of the reference magnetic field must be stored in advance so that the inferred or corrected pulse occurrence times tb', tc' and td' corresponding to the magnetic thin wires 1b, 1c and 1d can be calculated by the above procedure even when the maximum value Hm is changed (STEP 1-STEP 5). Furthermore, by comparing the phases of the pulse train (ta', tb'', tc'', and td'') detected at STEP 2 with the phases inferred at STEP 5, validity of the pulse train (ta', tb'', tc'', and td'') detected by the detection coil 7 is confirmed (STEP 6). Thus, the proper pattern of the magnetic marker can be correctly recognized (STEP 7).

Although in the above embodiment, the first detected pulse at STEP 2 is adopted as the reference, any one of the second to fourth detected pulses can be used as the reference.

[B] SECOND EMBODIMENT

Figure 9A:
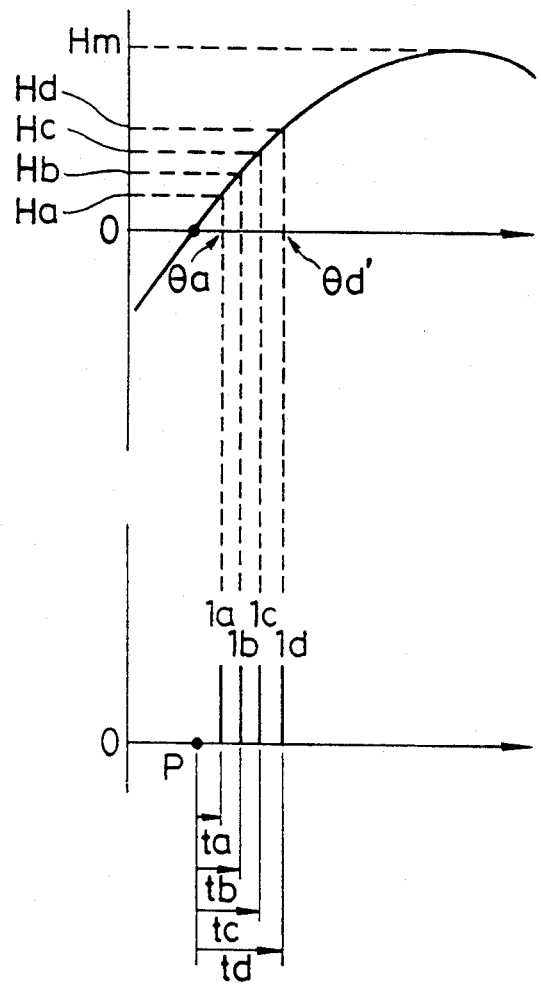
FIG. 9A is a diagram illustrating the reference sinusoidal waveform of the alternating magnetic field, along with a pulse train generated by the waveform.
Figure 9B:
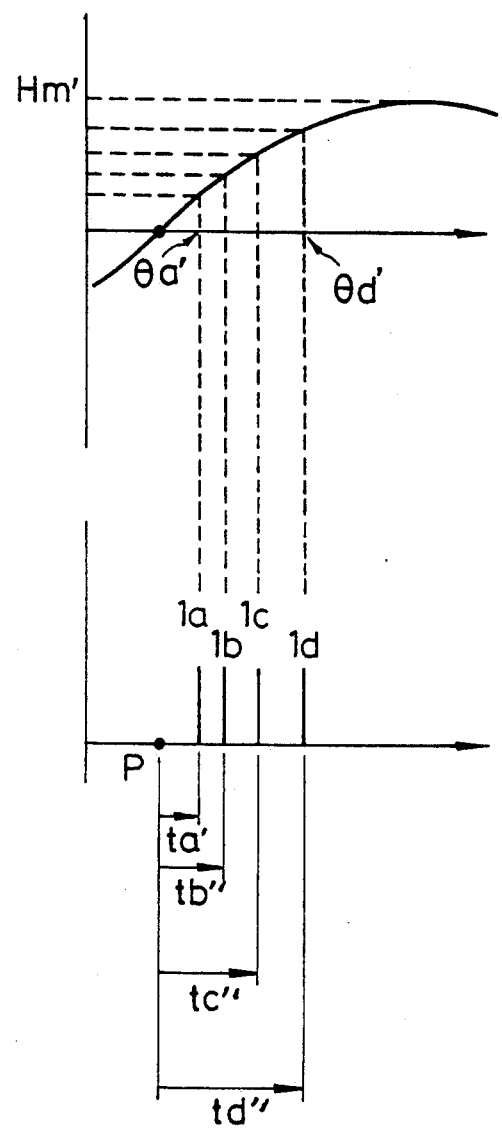
FIG. 9B is a diagram illustrating a waveform and the pulse train generated by the waveform in the case where the peak value of the magnetic field in FIG. 9A varies.
Figure 10:
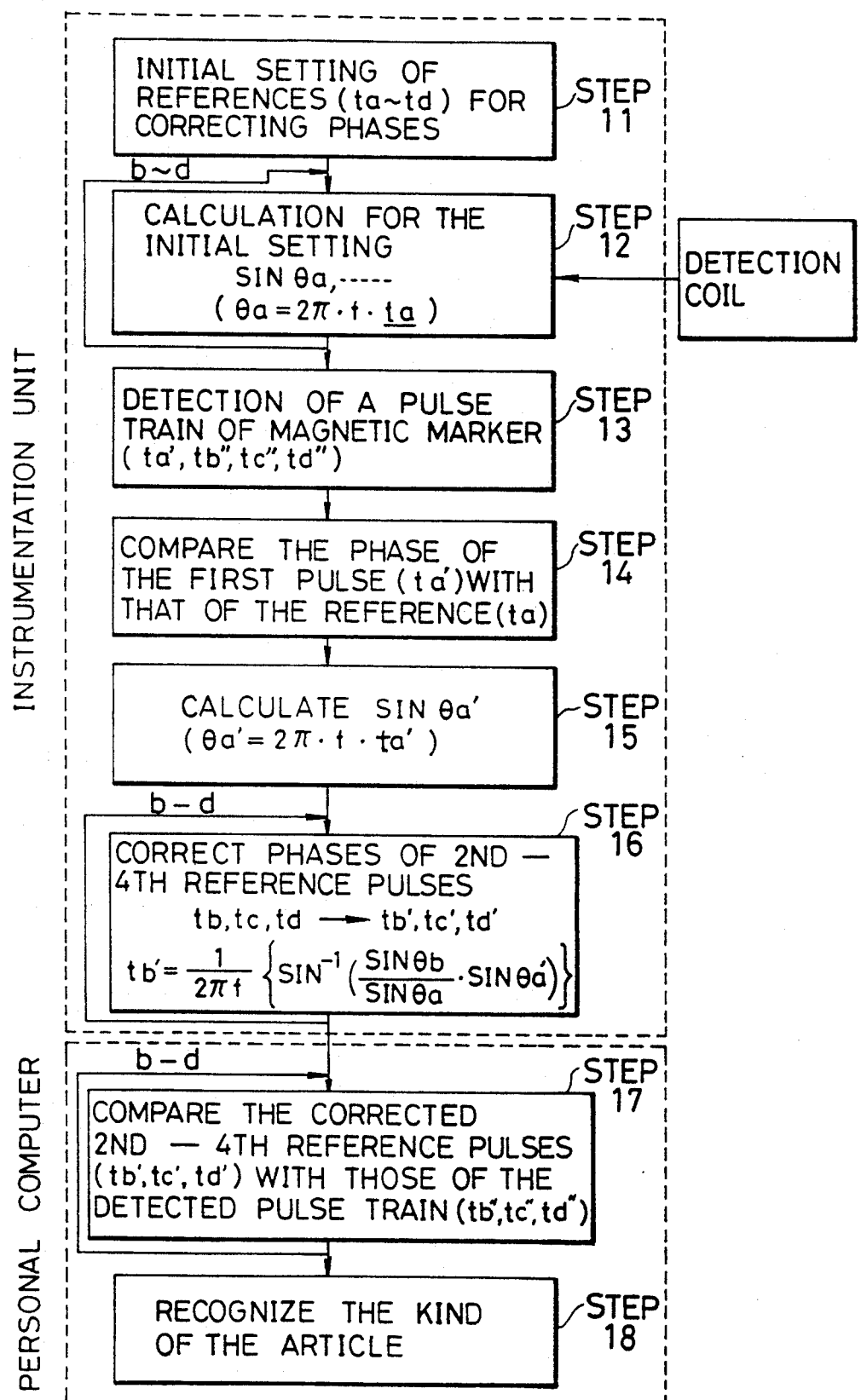
FIG. 10 is a flowchart showing the procedure of a second embodiment of the present invention.

FIGS. 9A, 9B and 10 show a second embodiment of the present invention in which a sinusoidal alternating magnetic field is applied to the magnetic marker. The procedure shown in flowchart of FIG. 10 identifies the kind of articles in a manner similar to the procedure shown in FIG. 8: using the pulse generated in connection with the first magnetic thin wire 1a as the reference; inferring the phase positions of the respective pulses to be detected according to the reference; and indentifying the kind of articles on the basis of the inferred phase positions. In the flowchart, STEP 11-STEP 16 are performed by the instrumentation unit 8, and STEP 17 and STEP 18 are conducted by the personal computer 9.

When the sinusoidal alternating magnetic field is used, a different correction is performed for the respective times ta-td instead of the correction using the same correction coefficient (ta'/ta) for all the times ta-td as in the triangular waveform. FIGS. 9A and 9B show the case where the maximum value Hm of the sinusoidal magnetic field is changed from Hm to Hm', in which the sinusoidal waveforms are depicted in a manner similar to the triangular waveforms in FIGS. 7A and 7B. The coercive forces Hca, Hcb, Hcc and Hcd of the thin magnetic wires 1a–1d are expressed as follows (STEP 11 and STEP 12):

$$H_{ca} = H_m \cdot \sin\theta_a = H_m' \cdot \sin\theta_a'(\theta_a = f \cdot t_a \cdot 2\pi, \theta_a' = f \cdot t_a' \cdot 2\pi)$$
$$H_{cb} = H_m \cdot \sin\theta_b = H_m' \cdot \sin\theta_b'(\theta_b = f \cdot t_b \cdot 2\pi, \theta_c' = f \cdot t_b' \cdot 2\pi)$$
$$H_{cc} = H_m \cdot \sin\theta_c = H_m' \cdot \sin\theta_c'(\theta_c = f \cdot t_c \cdot 2\pi, \theta_c' = f \cdot t_c' \cdot 2\pi)$$
$$H_{cd} = H_m \cdot \sin\theta_d = H_m' \cdot \sin\theta_d'(\theta_d = f \cdot t_d \cdot 2\pi, \theta_c' = f \cdot t_d' \cdot 2\pi)$$

where f is the frequency of the magnetic field, and $\theta a$, $\theta b$, $\theta c$ and $\theta d$ are phases of the respective pulses of the pulse train generated corresponding to the magnetic thin wires 1a, 1b, 1c and 1d, the phases being expressed with reference to the alternating magnetic field.

The occurrence time tb', tc' and td' of the pulses generated in connection with the magnetic thin wires 1b, 1c and 1d can be inferred as follows on the basis of the change in time, from ta to ta', of the pulse generated in connection with the first magnetic thin wire 1a (STEP 11–STEP 16). In this case, all the times ta–td and ta', tb''–td'' are measured from the zero-cross point.

$$\sin\theta_b' = \frac{H_m}{H_m'} \sin\theta_b = \frac{\sin\theta_b}{\sin\theta_a} \sin\theta_a' \rightarrow$$

$$t_b' = \frac{1}{2\pi f}\left(\sin^{-1}\left(\frac{\sin\theta_b}{\sin\theta_a}\sin\theta_a'\right)\right)$$

$$\sin\theta_c' = \frac{H_m}{H_m'} \sin\theta_c = \frac{\sin\theta_c}{\sin\theta_a} \sin\theta_a' \rightarrow$$

$$t_c' = \frac{1}{2\pi f}\left(\sin^{-1}\left(\frac{\sin\theta_c}{\sin\theta_a}\sin\theta_a'\right)\right)$$

$$\sin\theta_d' = \frac{H_m}{H_m'} \sin\theta_d = \frac{\sin\theta_d}{\sin\theta_a} \sin\theta_a' \rightarrow$$

$$t_d' = \frac{1}{2\pi f}\left(\sin^{-1}\left(\frac{\sin\theta_d}{\sin\theta_a}\sin\theta_a'\right)\right)$$

The arc trigonometric functions can be approximated by developing them into polynomial series. The description of the other procedures is omitted here because they are similar to those of the first embodiment illustrated in FIG. 8.

The above thus describes the method of inferring the occurrence time (or phases) of the pulses in the pulse train when the alternating magnetic field is either triangular or sinusoidal, and the maximum value Hm thereof changes. When the article is recognized by identifying a plurality of magnetic markers 1 or the detected element 10 by the above method, the resultant amount with regard to the coefficients are displayed by the personal computer 9.

In the apparatus shown in FIG. 1, a pair of exciting coils 5a and 5b are placed so as to face each other on both side of the belt 4. The number of exciting coils, however, is not restricted to two: in particular, when the angle of a plurality of the magnetic markers 1 or the detected element 10 against the exciting coils 5a and 5b is near 90 degrees, it is difficult to identify the markers 1 or the element 10; and so more coils should be provided to detect them. For example, when the angle $\theta$ shown in FIG. 6 takes a value of about 90 degrees, detection of the pulse train becomes difficult: in such a case, two pairs of exciting coils should be provided.

Figure 11:
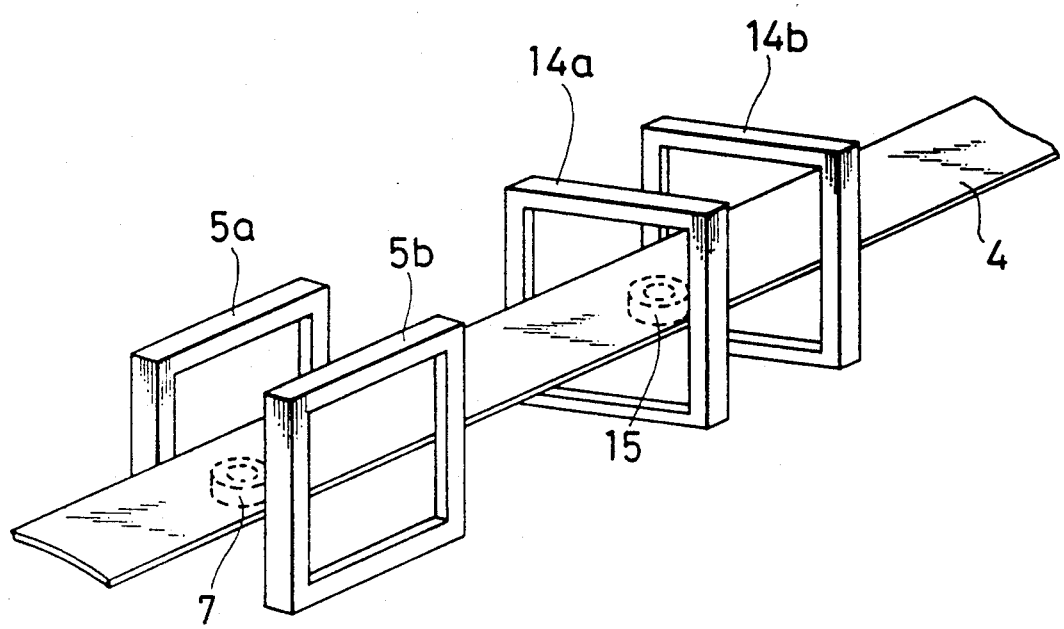
FIG. 11 is a schematic perspective view showing an arrangement using two pairs of exciting coils.

FIG. 11 is a schematic view mainly showing exciting coils. In FIG. 11, two pairs of exciting coils, the exciting coils 5a and 5b, and another pair of exciting coils 14a and 14b are placed in such a manner that the axis of the coils 5a and 5b is perpendicular to the axis of the coils 14a and 14b. The alternating magnetic field is separately provided to each pair of coils. In addition, the detection coil 7 is provided under the belt 4 between the coils 5a and 5b, and the detection coil 15 is provided under the belt 4 between the exciting coils 14a and 14b. Thus, the pulse train can be detected independently of the direction of a plurality of magnetic markers 1 or of the detected element 10.

As described above, the present invention uses the magnetic markers, or the detected elements which includes the magnetic markers attached to a plastic plate or the like: the magnetic marker comprises a plurality of amorphous magnetic thin wires or thin bands which have highly rectangular hysteresis curves and different coercive forces, and are deposited in a parallel fashion with a predetermined separation each other. The magnetic marker or detected element is attached to an article passing through the alternating magnetic field. This induces a temporal pulse train in the detection coil, which serves to identify the kind of the magnetic markers or the article by pattern recognition of the pulse train. The present invention, as described in the embodiments, stores in advance in the instrumentation unit, reference times (phases) which are determined by measuring the occurrence time of each pulse when magnetic markers are passed through the alternating magnetic field with the standard maximum value. The occurrence time of each pulse is measured from the zero-cross point of the waveform of alternating magnetic field, and the stored occurrence time (phase) of each pulse is adopted as the reference, which then will be corrected according to the method of the invention, to account for variations in the peak value of the magnetic field in the course of identifying a magnetic marker. Thus, in identifying the magnetic markers, the phase (time) of the first pulse produced from the magnetic markers is compared with the reference phase, and the ratio of these two phases is used to infer the subsequent pulse phases, i.e., correct the stored reference phases The detected pulses produced by a marker are then compared with the corrected reference phases for identifying the marker. Thus, the present invention makes it possible to correctly identify the kind of a magnetic marker independently of the change in the intensity of the magnetic field due to the uneven distribution of the magnetic field, or to the direction of the marker in the alternating magnetic field.

Although specific embodiments of an identification method of magnetic markers in accordance with the present invention have been disclosed, it is not intended that the invention be restricted to either the specific configurations or the uses disclosed herein. Modifications may be made in a manner obvious to those skilled in the art. Accordingly, it is intended that the invention be limited only by the scope of the appended claims.

What is claimed is:

1. An identification method using a magnetic marker which includes a plurality of magnetic, thin wires or thin bands which have highly rectangular hysteresis curves and different coercive forces, and which are deposited in a parallel fashion with a predetermined separation from each other, the magnetic marker being attached to an article which is passed through an alternating magnetic field to induce a temporal pulse train in a detection coil so that the article can be identified by recognizing the pulse train, said method comprising the steps of:

detecting a reference pulse train produced by the magnetic thin wires or thin bands of the markers when the marker is passed through a reference alternating magnetic field with a known maximum value;

storing respective phases of pulses of the reference pulse train as reference phases;

detecting a first pulse train produced by the magnetic thin wires or thin bands of the marker when the marker is passed through a first alternating magnetic field;

calculating an adjustment value which is a function of the phase of a selected pulse of the first pulse train;

correcting the reference phases of the other pulses of the reference pulse train on the basis of the adjustment value;

comparing the corrected reference phases with corresponding phases of the detected pulses of the first pulse train; and identifying the article on the basis of results of said comparing step.

2. An identification method as claimed in claim 1, wherein the first alternating magnetic field is produced by first and second exciting coils provided on respective sides of the passage of the article, and said step of detecting the first pulse train is performed by a first detection coil provided in the first alternating magnetic field.

3. An identification method as claimed in claim 2, further comprising the steps of:

producing a second alternating magnetic field by a second pair of exciting coils having an axis which is perpendicular to the axis of the first pair of exciting coils;

detecting a second pulse train produced by the magnetic thin wires or thin bands of the marker when the marker is passed through the second alternating magnetic field;

calculating a second adjustment value which is a function of the phase of a selected pulse of the second pulse train correcting the reference phases of the other pulses of the reference pulse train on the basis of the second adjustment value to produce second corrected reference phases;

comparing the second corrected reference phases with the phases of the detected pulses of the second pulse train; and identifying the article on the basis of results of at least one of said comparing steps.

4. An identification method as claimed in claim 3, wherein the step of detecting the second pulse train includes detecting the second pulse train by a second detecting coil provided in the second alternating magnetic field.

5. An identification method as claimed in claim 1, wherein said reference and first alternating magnetic fields have a triangular waveform.

6. An identification method as claimed in claim 1, wherein said reference and first alternating magnetic fields have a sinusoidal waveform.

7. An identification method as claimed in claim 6, wherein the adjustment value of said calculating step is the SIN of the phase of the selected pulse of the first pulse train.

8. An identification method as claimed in claim 1, wherein the phases of pulses are measured as elapsed time from the zero-cross point of the alternating magnetic field through which the magnetic thin wires or thin bands pass.

9. An identification method as claimed in claim 1, wherein the adjustment value of said calculating step is the ratio between the phase of the selected pulse of the first pulse train and the reference phase corresponding to the selected pulse of the first pulse train.

* * * * *